United States Patent [19]

Badger et al.

[11] Patent Number: 5,719,864
[45] Date of Patent: Feb. 17, 1998

[54] LOGICAL CHANNEL RESOLUTION IN ASYNCHRONOUS TRANSMISSION MODE COMMUNICATION SYSTEMS

[75] Inventors: Ryan Lance Badger, Wake Forest; Vernon Roberts Norman; Brian Alan Youngman, both of Cary, all of N.C.

[73] Assignee: International Business Machines Corp., Armonk, N.Y.

[21] Appl. No.: 513,711

[22] Filed: Aug. 11, 1995

[51] Int. Cl.$^6$ .................................................. H04L 12/28
[52] U.S. Cl. .................... 370/395; 370/397; 370/399; 370/392; 395/416
[58] Field of Search ................................ 370/395, 397, 370/399, 392, 465, 410, 230, 232, 233, 396; 395/416, 418

[56] References Cited

U.S. PATENT DOCUMENTS

| | | | |
|---|---|---|---|
| 5,132,966 | 7/1992 | Hayano et al. | 370/233 |
| 5,265,091 | 11/1993 | van Landegem | 370/232 |
| 5,267,232 | 11/1993 | Katsube et al. | 370/230 |
| 5,271,010 | 12/1993 | Miyake et al. | 370/392 |
| 5,303,233 | 4/1994 | Sugawara | 370/399 |
| 5,414,701 | 5/1995 | Shtayer et al. | 370/395 |
| 5,467,349 | 11/1995 | Huey et al. | 370/397 |
| 5,479,401 | 12/1995 | Bitz et al. | 370/397 |

OTHER PUBLICATIONS

L. DeMounem et al., Architecture and Mechanism of the Control and OAM Information Transport Network Using a Distributed Directo *IEICE Transactions on Communications*, vol. E76–B, No. 3, pp.291–303, Mar. 1993.

*Primary Examiner*—Wellington Chin
*Assistant Examiner*—Melissa Kay Carman
*Attorney, Agent, or Firm*—S. B. Phillips; Thomas F. Galvin

[57] ABSTRACT

An asynchronous transmission mode data cell header includes virtual channel and virtual path identifiers which are resolved into logical channel identifiers at the user interface by two table lookup operations. The virtual path identifier is used to access a virtual path table entry having a variable length pointer value buffered out to a fixed length field by zeros with a binary one at the boundary position. Using the binary one as a marker, the pointer field is extracted and concatenated with a base register value and the lower order bits of the virtual channel identifier, corresponding to the bit position of the binary one marker, to provide an index into a logical channel identifier table. The logical channel identifier is used to associate the data cell attached to that header with the appropriate user data stream.

16 Claims, 3 Drawing Sheets

LOGICAL CHANNEL RESOLUTION IN ASYNCHRONOUS TRANSMISSION MODE COMMUNICATION SYSTEMS

TECHNICAL FIELD

This invention relates to asynchronous transmission mode (ATM) systems and, more particularly, to logical channel resolution at the end nodes of such asynchronous transmission mode systems.

BACKGROUND OF THE INVENTION

Broadband integrated services digital networks (B-ISDNs) typically operate in an asynchronous transmission mode (ATM) in which data to be delivered by the network from an originating station to a destination station is organized into cells, called asynchronous transfer mode (ATM) cells, of fixed length. Such cells include a header portion, typically five bytes long, which carries control information, including routing information for that cell, plus a fixed length data field, typically forty-eight bytes. The header, typically, contains at least two sub-fields containing the virtual address of the destination. In this sense, a virtual address is not the address of any particular hardware or location, but simply, an identifier, determined by exchanges of control signals between the originating node and the destination node, used to identify each ATM cell to the network, i.e., to the intermediate transmission links, switching points, and to the ultimate destination. The virtual address insures the transmission of the cell on an appropriate route to the destination node.

The virtual address in the header of an ATM cell, in turn, is typically made up of a two-byte virtual channel identifier (VCI) field and a one-byte virtual path identifier (VPI) field. Since the header is typically five bytes in length, significant amounts of other control information can be accommodated in the header. With twenty-four bits of the header devoted to the virtual address, 16,777,216 different and distinctive virtual addresses can be accommodated. Although such a large addressing capacity may be necessary for accommodating a very large international network of users, it is clear that no single network node switching point nor any single end node containing a user network interface (UNI) can, as a practical matter, provide for the translation of the entire universe of virtual addresses into locally recognizable addresses associated with local data streams. Examples of how this translation is accommodated at switching nodes are disclosed in H. Miyake et al. U.S. Pat. No. 5,271,010, granted Dec. 14, 1993, and T. Sugawara U.S. Pat. No. 5,303,233, granted Apr. 12, 1994, for single path output and multiple path broadcast outputs, respectively.

The translation of the virtual address in the header of an ATM data cell into a logical address at an end node is called logical channel resolution, and the resulting value is called the logical channel identifier (LCI). A logical channel is also an abstraction and is used at a termination of the ATM system to identify a stream of information as an entity. A large number of such streams of information are multiplexed together on the information highway and must be segmented and separated at the destination for reconstruction of the individual information streams. Logical channel resolution requires a system that quickly and efficiently identifies the subset of virtual circuit identifiers which are valid at that receiving node. The logical channel identifier is then used to do the actual data stream reconstruction and processing.

A major problem for ATM systems, then, is to provide logical channel resolution which will handle a variable number of end user data stream identifications for end nodes of varying capacity, which will be fast and efficient to implement to permit channel resolution in real time, and, finally, will be reasonably efficient to manage.

SUMMARY OF THE INVENTION

In accordance with the illustrative embodiment of the present invention, the resolution of a virtual address including virtual path identifier (VPI) fields and virtual channel identifier (VCI) fields into a logical channel identifier (LCI) is accomplished through the use of two table lookup operations. A first table, which is called the Virtual Path (VP) table, contains one entry for each of the possible values of the VPI field, i.e., 256 entries. Entries in the VP table are indexed using the VPI field in the header of the ATM cell. Each entry in the VP table, in turn, contains a variable length pointer value which is combined with the lower order bits of the VPI field and the contents of a logical channel identifier table base register (LCITBR) to form a pointer into a second table called the logical channel identifier (LCI) table. Each entry in the LCI table is the appropriate logical channel identifier for that virtual address. LCI table entries for invalid virtual addresses are zero.

More particularly, the values of the VCI field, determined by exchanges of control signals with the originating node, are packed into the lower order bits of the VCI field, which can be called the significant lower order bits of the VCI field. The number of the significant lower order bits is, of course, the logarithm, to the base two, of the number of data streams terminated at this network end node, raised to the next higher integer. Each entry in the VP table includes a length marker field, constructed to mark the length of the significant lower order bits of the VCI field, and the balance of the entry comprising a variable length pointer. The length of the marker field is marked by the first non-zero bit, scanning from right to left, in the VP table entry. The balance of the leftmost bits, then, comprise the variable length pointer value. The length of the marker field, marked by the first non-zero entry, also identifies the significant lower order bits of the VCI field which are used as the lower order bits of the index into the logical channel identifier table. The pointer value indexes into that portion of the LCI table corresponding to the VPI value from the header and is used for identifying data streams intended for this location. Finally, an LCI base register contains the address of the beginning of the LCI table. The complete address of an entry in the LCI table is therefore the concatenation of the base register value, the pointer value, and the significant low order bits of the VCI field. In accordance with the present invention, this technique allows a single logical address resolution procedure to accommodate a number of logical addresses varying from a very few, for small system end nodes serving only a few end users, to very large system end nodes serving a very large number of end users, up to 65,536, if the entire VCI field were to be used for data streams intended for this end node.

A major advantage of the present invention is the speed and simplicity of the logical channel resolution scheme. Bit scanning and table lookup are both fast and simple processes which, when combined in the manner taught in the present invention, allow extremely powerful and extremely versatile channel resolution.

BRIEF DESCRIPTION OF THE DRAWING

A complete understanding of the present invention may be gained by considering the following detailed description in conjunction with the accompanying drawings, in which.

To facilitate reader understanding, identical reference numerals are used to designate elements common to the figures.

DETAIL DESCRIPTION

Figure 1:
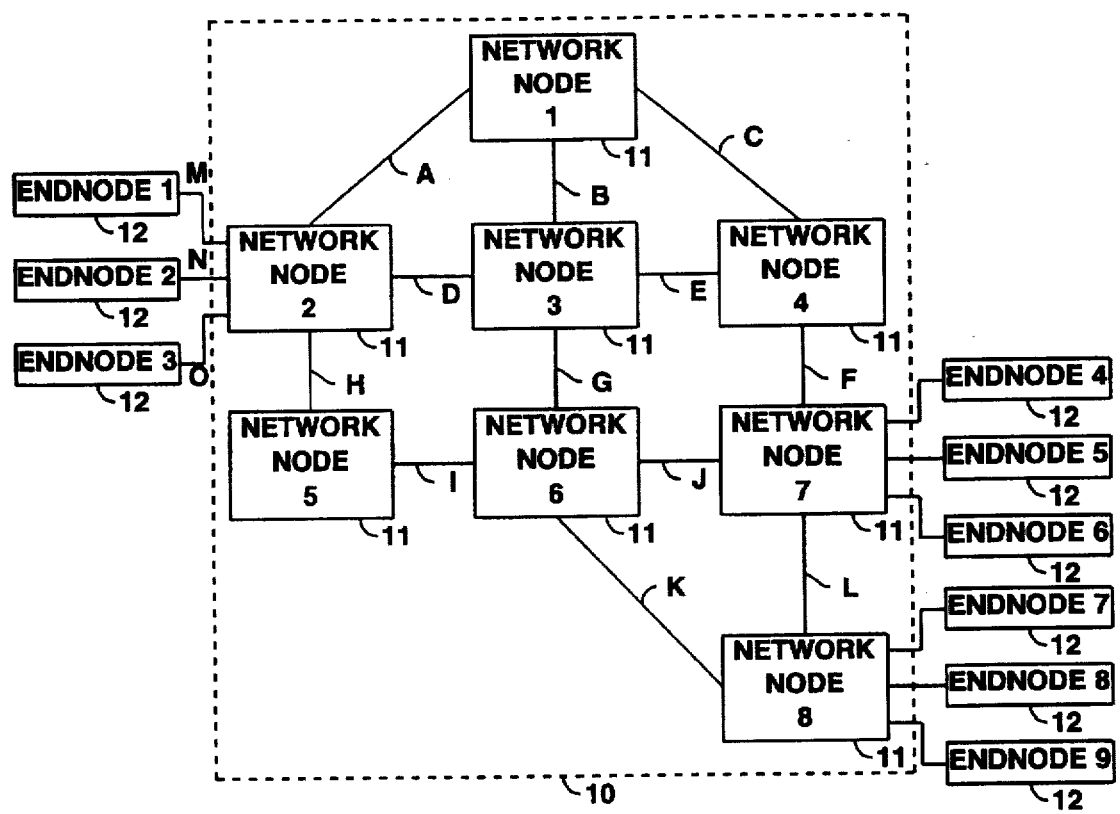
FIG. 1 shows a general block diagram of an asynchronous transmission mode network in which the logical channel resolution technique of the present invention might find use.

Referring more particularly to FIG. 1, there is shown a general block diagram of an ATM transmission system 10 comprising eight network nodes 11 numbered 1 through 8. Each of network nodes 11 is linked to others of the network nodes 11 by one or more communication links A through L. Each such communication link may be either a permanent connection or a selectively enabled (dial-up) connection. Any or all of network nodes 11 may be attached to end nodes, network node 2 being shown as attached to end nodes 1, 2 and 3, network node 7 being shown as attached to end nodes 4, 5 and 6, and network node 8 being shown as attached to end nodes 7, 8 and 9. Network nodes 11 and end nodes 12 each comprise a data processing system which provides data communications services to all connected nodes, network nodes and end nodes, as well as providing data switching points within the node. The network nodes 11 each comprise one or more switching points within the node, at which point incoming ATM data cells are selectively routed on one or more of the outgoing communication links terminated within that node or at another node. Such routing decisions are made in response to information in the header of the data cell, typically referred to as a virtual channel identifier and a virtual path identifier. In accordance with the present invention, each of the end nodes 12 includes a mechanism for translating the virtual channel and virtual path identifiers in the header of each ATM data cell into a logical channel identifier to be used to associate that particular data cell with a particular user or user application.

Each of end nodes 12 is connected to a plurality of users and user applications of digital data to be transmitted to other users or user applications connected to another end node 12 of the network 10 of FIG. 1. Users of the ATM communications network 10 of FIG. 1 utilize an end node device 12 connected to a local network node I 1 for access to the ATM network 10. The end nodes 12 translate the user's data into cells formatted appropriately for transmission on the ATM network of FIG. 1 and generates the header which is used to route the packets through the network 10. Each of network nodes 10 modify the headers in each data cell to properly forward that data cell on to the next network node on the way to the destination node, all in accordance with well known ATM transmission system operation.

Figure 2:
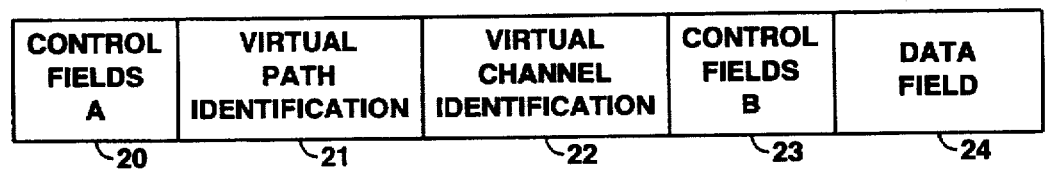
FIG. 2 shows a graphical representation of an asynchronous transmission mode data cell, including a header with a virtual address, used for the transmission of data in the network of FIG. 1.

In FIG. 2 there is shown a graphical representation of a single data cell used for the transmission of data through the ATM network of FIG. 1. The data cell of FIG. 2 comprises a header, including fields 20, 21, 22 and 23, and a data field 24. By convention, the data field 24 consists of forty-eight bytes of data and the header consists of five bytes. The header includes a virtual path identification (VPI) field 21, typically consisting of eight bits, and a virtual channel identification (VCI) field 22, typically consisting of sixteen bits. Also included in the header for the ATM cell of FIG. 2 are a plurality of control fields 20 and 23 which may include, for example, priority class information, flow control information, cell type identification and error detection and/or correction fields. Since these fields form no part of the present invention, they will not be further described here.

The values in the VPI field 21 and the VCI field 22 are determined by the originating node and the destination node while the connection is being set up. It should be first noted that neither the virtual channel identifier in field 22 nor the virtual path identifier in field 21 are unique for the entire ATM network of FIG. 1, but only for a particular transmission route. The values in the VPI field 21 and VCI field 22 are determined at the time the connection is initiated to utilize only the number of bits necessary to separately identify all of the data streams at a particular end node, and to utilize only the lower order bits of the VCI field 22. These lower order bits of the VCI field 22, used to distinguish the data streams at a single destination node, can be called the significant lower order bits and may, in fact, take up the entire VCI field 22 if necessary to distinguish all of the data streams intended for a particular end node 12 of FIG. 1.

Figure 3:
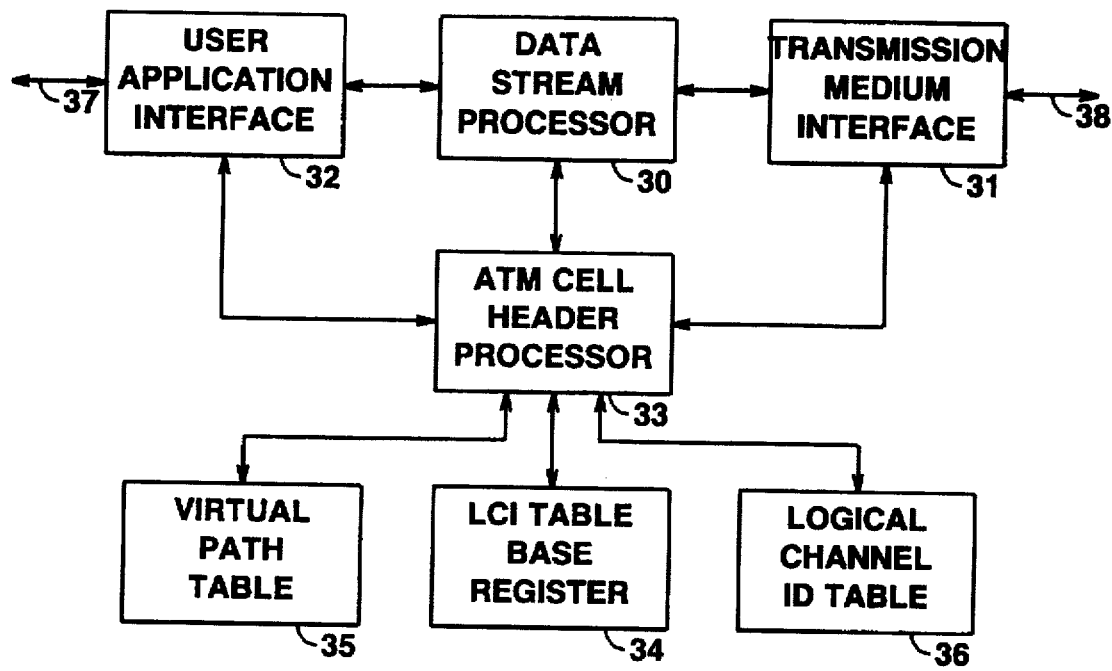
FIG. 3 shows a more detailed block diagram of an end node in the asynchronous transmission mode network of FIG. 1, including a header processor in which the logical channel resolution of the present invention may find use.

In FIG. 3 there is shown a more detailed block diagram of one of the end nodes 12 of FIG. 1. As previously noted, the end nodes 12 are utilized to connect a user application to the ATM network of FIG. 1. A user application interface circuit 32 interfaces with the user data on input lines 37. An ATM cell header processor 33 generates ATM cell headers and, in data stream processor 30, breaks the user data streams into ATM cells, applying an appropriate header to each cell, and sending the cells on to transmission medium interface 31. Transmission medium interface 31 prepares the ATM cells for transmission on the transmission medium 38.

ATM cell header processor 33 in FIG. 3 generates the headers for outbound traffic from interface circuit 32 and resolves the virtual addresses on inward bound traffic from transmission medium interface 31 to route this inbound traffic to the appropriate user application connected to interface circuit 32. In this context, the term logical channel resolution means the translation of the virtual circuit header identifier fields 21 and 22 (FIG. 2) into a logical channel identifier (LCI) useful in identifying the data stream intended for a particular user application connected to interface circuit 32. This resolution process, accomplished by processor 33, is the subject matter of this invention and utilizes a logical channel table base register 34, a virtual path table 35 and a logical channel identifier table 36. Virtual path table 35 contains one entry for each of the possible values of the virtual path identifier field 21 of FIG. 2. Since there are eight bits in the VPI field 21, table 35 may have up to 256 entries. Each entry of virtual path table comprises a variable length pointer field and a variable length marker field. As will be described in connection with FIG. 4, the marker field is an all zeros field with a single "1" at its leftmost position. This "1" thus marks the beginning of the variable length pointer field and can be used to isolate and retrieve the pointer field. The pointer field in the entries of virtual path table 35 serve as pointer offsets into the logical channel identifier table 36, described below.

The logical channel identifier table base register 34 contains the base location of the logical channel identification (LCI) table 36 in a storage medium such as the random access memory (RAM) of a computer, and thus serves as a base for offset values of entries in the LCI table 36. LCI table 36 contains the logical channel identifier values themselves. When properly accessed, these logical channel identifiers can be used to identify the corresponding ATM cell and process that cell, in data stream processor 30, to reassemble the data stream for delivery to interface 32. The logical channel resolution process can be better understood in connection with FIG. 4.

The functional boxes of FIG. 3 can be realized with special purpose circuitry well known in the prior art and of the type disclosed in the afore-mentioned U.S. Pat. No. 5,271,010 and 5,303,233. These functional blocks can also be realized by programming a general purpose computer. Any person of ordinary skill in the these arts will find it obvious to program a general purpose computer to accomplish these results, particularly in view of the following further descriptions in connection with FIGS. 4 and 5.

Figure 4:
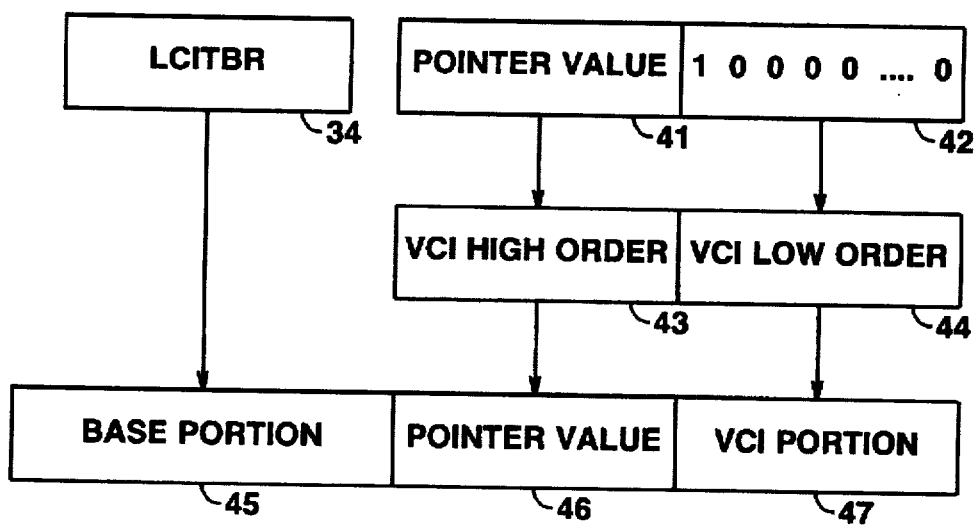
FIG. 4 shows a graphical representation of the process used to resolve logical channels in accordance with the present invention.

Referring then to FIG. 4, there is shown a graphical representation of the logical channel resolution in accordance with the present invention. Such resolution involves the construction of an index to LCI table 36 (FIG. 3), using the VP table 35, the LCI table base register 34 and the VPI and VCI values from the header of the ATM cell. In FIG. 4, the LCI table base register 34 contains a value which comprises the base portion 45 of a LCI table index 45-46-47. Fields 41-42 together comprise one entry in the virtual path table 35 (FIG. 3), accessed by the virtual path identifier (field 21, FIG. 2). The virtual path table entry 41-42 comprises a pointer value sub-field 41 and a marker sub-field 42. The marker sub-field 42 contains all zeros except for the leftmost (highest order) bit, which is a "1." Since pointer sub-field 41 is of variable length, marker sub-field 42 provides a convenient mechanism for easily determining the length of the pointer sub-field 41. That is, sub-field 42 can be scanned, right to left, until the first "1" is detected. That bit position is the highest order bit position of the marker sub-field and hence the lowest order bit position of the pointer value is the next higher bit position of the virtual path table entry 41-42. Since the virtual path table entry is typically sixteen bits wide, the marker sub-field 42 size can vary from one to sixteen bits in length, the resultant pointer value sub-field 41 can vary from zero to fifteen bits in length. The pointer value is substituted for the higher order bits 43 of the VCI field 22 (FIG. 2) and becomes the middle portion 46 of the logical channel identifier table (36 in FIG. 3) index 45-46-47.

Finally, the width of the marker sub-field 42 is used as a mask to separate the lower order bits 44 and the high order bits 43 of the virtual channel identifier 43-44. The higher order bits 43 are examined to verify that they are all zeros, and thus that the significant low order bits have been properly identified. These lower order bits 44 become the lowest order bits 47 of the logical channel identifier table index 45-46-47. The contents of the index 45-46-47 are used to address the logical channel identifier table 36 of FIG. 3 and retrieve the logical channel identifier (LCI) corresponding to these virtual path and virtual channel identifier values. This LCI value is used in data stream processor 30 of FIG. 3 to assemble this ATM cell into the appropriate data stream for delivery to the appropriate user application connected to user application interface 32.

It can be seen that the channel resolution process outlined in connection with FIG. 4 involves two table lookups and a scan for the first one bit in the virtual path table entry. All of these processes can be implemented by extremely rapid operations and hence the table resolution can be carried out very quickly. Moreover, the variable length of the pointer sub-field 41 permits the same channel resolution procedure to be used in end nodes having a very small (less than ten) number of users as is used in end nodes serving very large numbers (thousands) of users. This makes the channel resolution process of the present invention very adaptable and capable of universal use in the many different end nodes existing in ATM networks.

The construction of virtual path table 35 is straightforward and is accomplished dynamically and incrementally as the connections are set up through the ATM network. At connection setup time, the source node and the destination node determine the values of the VPI and VCI fields to insure uniqueness of the virtual route identifiers for this route. The destination node therefore proposes low order VCI bit patterns to keep the binary number sequence compact and low valued, using the minimum number of lower order VCI bits necessary to accommodate the currently active number of users at that destination node. Once the lower order VCI bits are assigned, the appropriate entries in virtual path table 35 can be readily constructed, using these lower order bits width to construct the marker sub-field 42, and to add a pointer sub-field value to offset the logical channel table index into a heretofore unused portion of the logical channel identifier table 36. It will be noted that logical channel identifier table 36 can include over 64,000 entries. In the typical case, however, the size of the LCI table 36 is much smaller, only large enough to accommodate the data streams at that end node, and is very densely populated with logical channel identifier values. The balance of the entries in the LCI table 36 are all zeros, indicating invalid VPI/VCI values, usually arising from the termination of connections.

Figure 5:
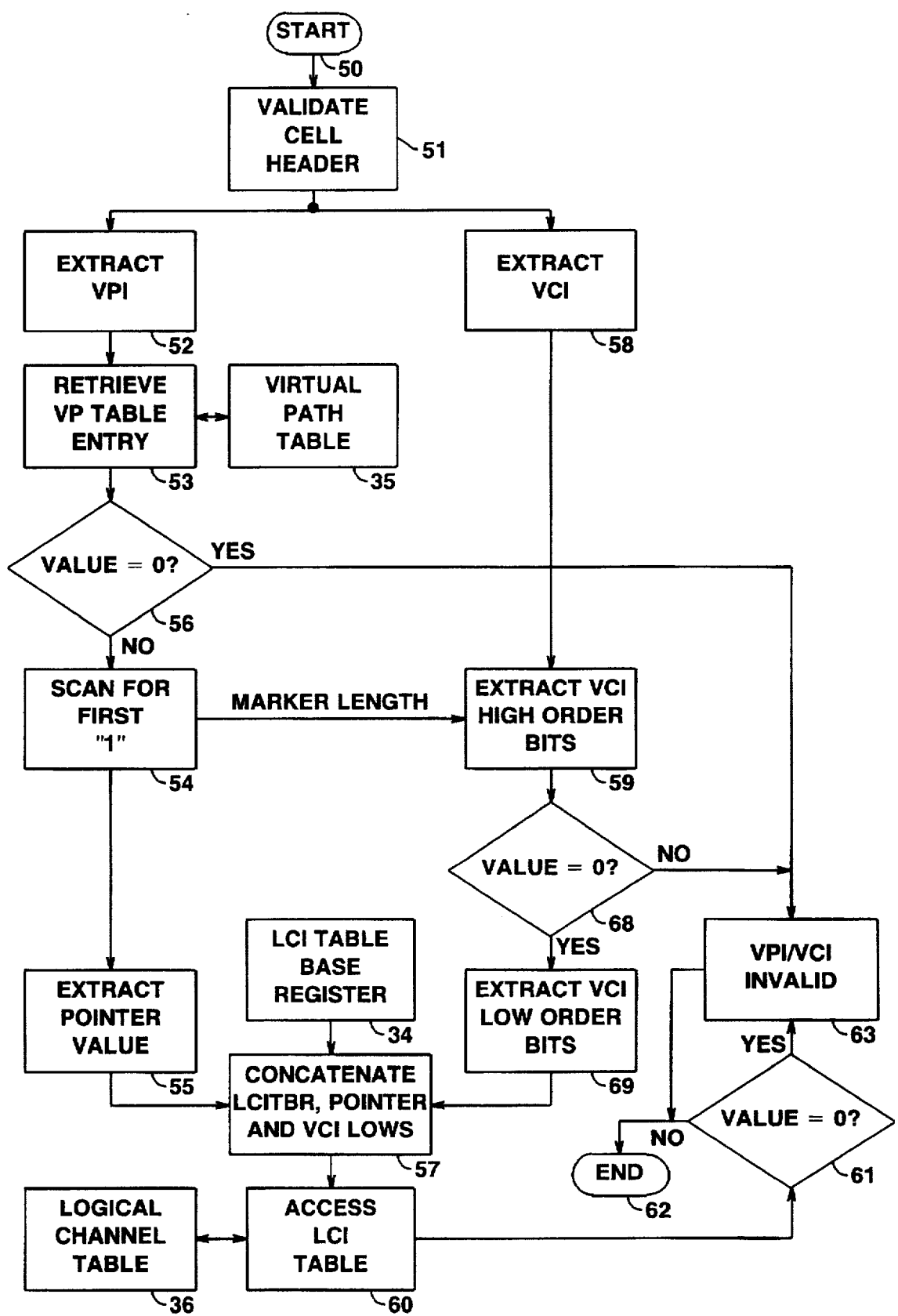
FIG. 5 shows a flow chart of the process for resolving logical channel identifications in an asynchronous transmission mode data communications system.

Referring more particularly to FIG. 5, there is shown a flow chart of the process for resolving virtual addresses in the header of data cells in an asynchronous transmission mode communications system into logical channel identifiers in accordance with the present invention. Starting at start box 50, box 51 is entered where the cell header is validated, using an error detection or correction field which may form part of control field 23 of FIG. 2. If the header is valid, box 52 is entered where the virtual path identification value (field 21, FIG. 2) is extracted from the header of the cell tested in box 51. Simultaneously, the virtual channel identification value (field 22, FIG. 2) is extracted from the header in box 58.

Returning to extraction box 52, box 53 is entered where, using the value of the virtual path identifier as a table index, the virtual path table 35 (table 35, FIG. 3) is accessed to retrieve the VP table entry corresponding to that VPI byte value. Decision box 56 is then entered to determine whether or not the value retrieved from virtual path table 35 is all zeros. If this value is all zeros, box 63 is entered where the VPI/VCI value is noted as invalid, the attached data field 24 (FIG. 2) is discarded and the process terminated in terminal box 62. If the virtual path table entry is not all zeros, as determined by decision box 56, box 54 is entered to scan the virtual path table entry, starting on the right, for the first "1" in the marker sub-field (42 in FIG. 4). Using the position of the first "1" bit in the marker sub-field as a boundary marker, box 55 is entered to extract the pointer value from the VP table entry extracted in box 53. Box 57 is then entered to concatenate this pointer value with other values to be obtained as described below.

A logical channel identification base register 34 (register 34 of FIG. 3) contains the address of the beginning of the logical channel identifier table (36 in FIG. 3). This base register value is concatenated with the pointer value from box 55 in concatenation box 57. The length of the marker field, determined in box 54, is used to separate the virtual channel identification value, obtained in box 58, into a low order portion, bordered at the bit position corresponding to the marker length, and a high order portion corresponding to the bits above the marker length. Using the marker length from box 54, the high order portion of the VCI field 43 is extracted in box 59 from the VCI field of the ATM cell header obtained in box 58. Decision box 68 is then entered to determine whether or not the value extracted in box 59 is all zeros. If this value is not all zeros, box 63 is entered where the value of the fields are noted as invalid. In that event, the attached data field 24 (FIG. 2) is discarded and the process terminated in terminal box 62.

If the higher order bits of the VCI value are all zeros, as determined by decision box 68, box 69 is entered where, using the marker length from box 54, the low order portion of the VCI field 44 contents is extracted from the VCI field of the ATM header obtained in box 58. These lower order bits of the VCI value extracted in box 69 are concatenated, as shown in FIG. 4, with the LCI base register value (from box 34) and the pointer value (from box 55) in concatenation box 57 to form an index into the logical channel identifier table 36. In box 60, this index is used to retrieve the value at that location in the LCI table 36. Decision box 61 is then entered to determine if the LCI value stored at that location in the LCI table 36 is equal to zero. If so, this LCI value is invalid at this end node. Box 63 is then entered to create a notice of invalidity and the process terminated in end box 62. On the other hand, if the value of the LCI table entry is not zero, as determined by decision box 61, the LCI is valid and can be used in FIG. 3 to properly assemble this ATM cell into the appropriate data stream in processor 30 of FIG. 3. The process then terminates in terminal box 62.

What is claimed is:

1. A logical channel resolution system for virtual path and virtual channel identification values comprising:

a virtual path table containing a plurality of entries each adapted to include a pointer value field and a position marker field;

a logical channel identifier table containing a plurality of entries each adapted to contain a different logical identifier;

means utilizing one of said virtual path identification values to retrieve one entry from said virtual path table;

means utilizing said position marker field to retrieve said pointer value and to truncate said virtual channel identification value;

means for concatenating said pointer value and the truncated virtual channel identification value to access said logical channel identifier table; and means for entering all binary zero entries into said virtual path table for all combinations of virtual path and virtual channel identification values not corresponding to any entry in said logical channel identifier table.

2. The logical channel resolution system according to claim 1 further comprising means for entering all binary zero entries into said logical channel identifier table for all invalid combinations of virtual path and virtual channel identification values.

3. The logical channel resolution system according to claim 1 further comprising means for attaching said virtual path and virtual channel identifiers to data cells, derived from a data stream, for transmission in an asynchronous transmission mode system, and means, utilizing one of said logical channel identifiers, for reassembling said data stream.

4. The logical channel resolution system according to claim 1 further comprising means for inserting an all binary zero value into said position marker field with a single binary one in the leftmost position of said position marker field, means for scanning for said single binary one to identify said pointer value, and means, responsive to said means for scanning, for truncating said virtual channel identification value.

5. A method for logical channel resolution system of virtual path and virtual channel identification values comprising the steps of:

storing a virtual path table containing a plurality of entries each adapted to include a pointer value field and a position marker field;

storing a logical channel identifier table containing a plurality of entries each adapted to contain a different logical channel identifier;

retrieving, utilizing said virtual path identification, one entry from said virtual path table;

utilizing said position marker field, retrieving said pointer value and truncating said virtual channel identification value, concatenating said pointer value and the truncated virtual channel identification value to access said logical channel identifier table; and entering all binary zero entries into said virtual path table for all combinations of virtual path and virtual channel identification values not corresponding to any entry in said logical channel identification table.

6. The method according to claim 5 further comprising the step of entering all binary zeros entries into said logical channel identifier table for all invalid combinations of virtual path and virtual channel identification values.

7. The method according to claim 5 further comprising the steps of attaching said virtual path and virtual channel identifiers to data cells, derived from a data stream, for transmission in an asynchronous transmission mode system, and utilizing one of said logical channel identifiers for reassembling said data stream.

8. The method according to claim 5 further comprising the steps of inserting an all binary zero values into said position marker field with a single binary one in the leftmost position of said position marker field, scanning for said single binary one to identify said pointer value, and truncating, in response to said step of scanning, said virtual channel identification value.

9. A system for converting a virtual asynchronous transmission mode data cell virtual address, including a virtual path identifier and a virtual channel identifier, into a logical channel identifier value comprising a virtual path table including a plurality of entries, each virtual path table entry comprising a variable length pointer field padded out to a fixed length with a field of binary zero bits having a single binary one bit at t eh leftmost bit position of said field of binary zeros, a logical channel identifier table for identifying particular streams of asynchronous transmission mode data cells, means, utilizing said virtual path identifier, for retrieving one entry from said virtual path table, means, utilizing said leftmost binary one bit, for extracting said variable length pointer, means, utilizing said leftmost binary one bit, for extracting from said virtual channel identifier, a lower order number of bits corresponding to the bit position of said binary one bit; and means for concatenating said variable length pointer and said lower order number of bits from said virtual channel identifier to form an index into said table of logical channel identifiers.

10. The system according to claim 9 further comprising means for inserting all binary zeros into all unused entries of said virtual path table.

11. The system according to claim 9 further comprising means for inserting all zeros into all unused entries of said logical channel identifier table.

12. The system according to claim 9 further comprising means for storing the beginning location of said logical channel identifier table in a base register, and means for concatenating said beginning location with said pointer value and said lower order bits of said virtual channel identification value.

13. A method for converting an asynchronous transmission mode data cell virtual address, including a virtual path identifier and a virtual channel identifier, into a logical channel identification value comprising the steps of storing a virtual path table including a plurality of entries, each virtual path table entry comprising a variable length pointer field padded out to a fixed length with a field of binary zero bits having a single binary one at the leftmost bit position of said field of binary zeros, storing a logical channel identifier table for identifying particular streams of asynchronous transmission mode data cells, utilizing said virtual path identifier, retrieving one entry from said virtual path table;

utilizing said leftmost binary one bit, extracting said variable length pointer, utilizing said leftmost binary one bit, extracting from said virtual channel identifier, a lower order number of bits corresponding to the bit position of said binary one bit; and concatenating said variable length pointer and said lower order number of bits from said virtual channel identifier to form an index into said table of logical channel identifiers.

14. The method according to claim 13 further comprising the step of inserting all binary zeros into all unused entries of said virtual path table.

15. The method according to claim 13 further comprising the step of inserting all binary zeros into all unused entries of said logical channel identifier table.

16. The method according to claim 13 further comprising the steps of storing the beginning location of said logical channel identifier table in a base register, and concatenating said beginning location with said pointer value and said lower order bits of said virtual channel identification value.

* * * * *